United States Patent
Beers et al.

(10) Patent No.: US 10,120,774 B2
(45) Date of Patent: Nov. 6, 2018

(54) COHERENCE PROTOCOL TABLES

(71) Applicant: Intel Corporation, Santa Clara, CA (US)

(72) Inventors: Robert Beers, Beaverton, OR (US); Yuvraj S. Dhillon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,559

(22) Filed: Dec. 26, 2014

(65) Prior Publication Data

US 2015/0178177 A1    Jun. 25, 2015

Related U.S. Application Data

(63) Continuation of application No. 13/976,950, filed as application No. PCT/US2013/032709 on Mar. 15, 2013.

(60) Provisional application No. 61/717,091, filed on Oct. 22, 2012.

(51) Int. Cl.
　　*G06F 11/36*　　(2006.01)
　　*G06F 13/38*　　(2006.01)
　　*G06F 12/0831*　(2016.01)

(52) U.S. Cl.
　　CPC ...... *G06F 11/3604* (2013.01); *G06F 12/0831* (2013.01); *G06F 13/382* (2013.01); *G06F 2212/1016* (2013.01); *Y02D 10/14* (2018.01); *Y02D 10/151* (2018.01)

(58) Field of Classification Search
　　CPC ........ G06F 17/30; G06F 8/71; G06F 9/44505; G06F 8/20; G06F 8/61; G06F 8/36
　　USPC .......................................... 717/126; 707/687
　　See application file for complete search history.

(56) References Cited

U.S. PATENT DOCUMENTS

| | | | |
|---|---|---|---|
| 5,383,143 | A | 1/1995 | Crouch et al. |
| 5,983,326 | A | 11/1999 | Hagersten et al. |
| 6,626,960 | B1 * | 9/2003 | Gillam .......................... 715/201 |
| 6,892,319 | B2 | 5/2005 | Qadeer |
| 7,124,252 | B1 * | 10/2006 | Khare et al. .................. 711/137 |
| 7,149,852 | B2 | 12/2006 | Van Doren et al. |

(Continued)

FOREIGN PATENT DOCUMENTS

| | | |
|---|---|---|
| CN | 1702858 | 11/2005 |
| CN | 101430664 | 5/2009 |

(Continued)

OTHER PUBLICATIONS

Non-Final Office Action in U.S. Appl. No. 13/976,950 dated Apr. 29, 2015.

(Continued)

*Primary Examiner* — Pierre M Vital
*Assistant Examiner* — Andrew N Ho
(74) *Attorney, Agent, or Firm* — Alliance IP, LLC

(57) ABSTRACT

An agent is provided to include state table storage to hold a set of state tables to represent a plurality of coherence protocol actions, where the set of state tables is to include at least one nested state table. The agent further includes protocol logic associated with the state table storage, the protocol logic to receive a coherence protocol message, and determine a coherence protocol action of the plurality of coherence protocol actions from the set of state tables based at least in part on the coherence protocol message.

20 Claims, 10 Drawing Sheets

(56) References Cited

U.S. PATENT DOCUMENTS

| | | | |
|---|---|---|---|
| 7,272,688 B1* | 9/2007 | Glasco | 711/141 |
| 7,543,115 B1* | 6/2009 | Batson et al. | 711/141 |
| 7,783,654 B1* | 8/2010 | Sreenath | G11C 15/00 365/189.07 |
| 8,135,916 B1* | 3/2012 | O'Bleness et al. | 711/141 |
| 8,402,225 B2 | 3/2013 | Miller et al. | |
| 2001/0013089 A1* | 8/2001 | Weber | 711/146 |
| 2002/0129208 A1 | 9/2002 | Barroso et al. | |
| 2004/0003180 A1* | 1/2004 | Cypher | G06F 12/0828 711/141 |
| 2004/0093467 A1* | 5/2004 | Shen | G06F 12/0817 711/141 |
| 2004/0162826 A1* | 8/2004 | Wyschogrod et al. | 707/6 |
| 2004/0215895 A1* | 10/2004 | Cypher | 711/141 |
| 2004/0260885 A1* | 12/2004 | Landin | G06F 12/0815 711/144 |
| 2004/0260886 A1* | 12/2004 | Landin et al. | 711/145 |
| 2004/0268059 A1 | 12/2004 | Landin et al. | |
| 2005/0005075 A1 | 1/2005 | Landin et al. | |
| 2005/0160209 A1* | 7/2005 | Van Doren | G06F 12/0828 710/244 |
| 2005/0160238 A1* | 7/2005 | Steely et al. | 711/145 |
| 2005/0198192 A1* | 9/2005 | Van Doren et al. | 709/217 |
| 2005/0226201 A1 | 10/2005 | McMillin | |
| 2005/0240734 A1* | 10/2005 | Batson | G06F 12/0831 711/141 |
| 2006/0041715 A1 | 2/2006 | Chrysos et al. | |
| 2007/0055827 A1* | 3/2007 | Tsien | 711/141 |
| 2007/0067481 A1* | 3/2007 | Sharma et al. | 709/231 |
| 2008/0104344 A1 | 5/2008 | Shimozono et al. | |
| 2009/0006712 A1* | 1/2009 | Ehsan et al. | 711/1 |
| 2009/0198913 A1 | 8/2009 | Batson et al. | |
| 2009/0252326 A1 | 10/2009 | Buchmann et al. | |
| 2010/0005245 A1 | 1/2010 | Beers et al. | |
| 2010/0027473 A1 | 2/2010 | Ghosh | |
| 2010/0057809 A1 | 3/2010 | Ichino | |
| 2011/0082904 A1 | 4/2011 | Ebbes et al. | |
| 2011/0289267 A1 | 11/2011 | Flynn et al. | |
| 2012/0079214 A1* | 3/2012 | Moga | G06F 12/0831 711/146 |
| 2012/0317362 A1* | 12/2012 | Hendry | G06F 12/0831 711/130 |
| 2014/0114928 A1 | 4/2014 | Beers et al. | |
| 2015/0178177 A1 | 6/2015 | Beers et al. | |

FOREIGN PATENT DOCUMENTS

| | | |
|---|---|---|
| CN | 101971174 | 2/2011 |
| KR | 10-2011-0134855 | 12/2011 |

OTHER PUBLICATIONS

PCT International Search Report and Written Opinion received for the PCT Patent Application No. PCT/US2013/032709, dated Aug. 9, 2013, 11 pages.

PCT International Preliminary Report on Patentability in PCT International Application Serial No. PCT/US2013/032709 dated Apr. 28, 2015.

Korean Patent Office Notice of Preliminary Rejection in Korean Patent Application No. 2015-7007208 dated Jan. 6, 2016.

Final Office Action in U.S. Appl. No. 13/976,950 dated Aug. 24, 2015.

Final Office Action in U.S. Appl. No. 13/976,950 dated Jul. 28, 2016, 51 pages.

Non Final Office Action in U.S. Appl. No. 13/976,950 dated Apr. 20, 2017, 9 pages.

Non Final Office Action in U.S. Appl. No. 13/976,950 dated Jan. 25, 2016, 40 pages.

Chinese Second Office Action in Chinese Patent Application No. 201380049062.5 dated Aug. 4, 2017.

Final Office Action in U.S. Appl. No. 13/976,950 dated Oct. 18, 2017, 21 pages.

Korean Patent Office Notice of Allowance in Korean Patent Application 10-2016-7035979 dated Sep. 28, 2017, 8 pages (including translation).

Chinese First Office Action in Chinese Patent Application No. 201380049062.5 dated Nov. 21, 2106.

Korean Notice of Preliminary Rejection in Korean Patent Application No. 2016-7035979 dated Mar. 14, 2017.

"Finite-state machine," Wikipedia, https://web.archive.org/web/20120622083805/https://en.wikipedia.org/wiki/Finite-state_machine, retrieved from the internet on Jun. 23, 2017, 10 pages.

"UML state machine," Wikipedia, https://web.archive.org/web/20111208024945/https://en.wikipedia.org/wiki/UML_state_machine retrieved from the internet on Jun. 23, 2017, 12 pages.

German Patent First Office Action in German Patent Application No. 1120130041057 dated Jun. 26, 2017, 6 pages with translation.

* cited by examiner

Action A    _700_

| Current States | | | | Next State | |
|---|---|---|---|---|---|
| Command Addr | Condition 1 Boolean | CacheLine State | Condition 2 Boolean | CacheLine State | Msg to HNID | Msg to RNID |
| Cmd1 | TRUE | State 1 | TRUE | State 2 | Message 1 | Message A |
|  |  |  | FALSE |  | Message 2 |  |
|  | FALSE | State 2 |  | State 3 | Message 2 | Message B |
|  |  |  |  |  | Message 4 | Message A |
| Cmd2 | TRUE | State 1 | TRUE | State 2 | Message 3 | Message C |
|  |  |  | FALSE |  | Message 4 |  |
|  | FALSE | State 2 |  | State 3 | Message 1 | Message B |
|  |  |  |  |  | Message 2 | Message D |
|  |  |  |  |  | Message 3 | Message E |

Action A

| Command | Current States | | | | Next State | | |
|---|---|---|---|---|---|---|---|
| Addr | Condition 1 Boolean | CacheLine State | Condition 2 Boolean | CacheLine State | Msg to HNID | Msg to RNID |
| Cmd1 | TRUE | State 1 | TRUE | State 2 | Message 1 | Message A |
|  |  |  | FALSE |  | Message 2 | Message B |
|  | FALSE | State 2 |  | State 3 | Message 3 | Message A |
|  |  |  |  |  | Message 4 | Message C |
| Cmd2 | TRUE | State 1 | TRUE |  | Use Sub-action B | Message B |
|  |  |  | FALSE |  |  | Message D |
|  | FALSE | State 2 |  |  |  | Message E |

*700*

Sub-action B

| Condition 1 Boolean | Current States | | | Next State | |
|---|---|---|---|---|---|
|  | CacheLine State | Condition 2 Boolean | CacheLine State | Msg to HNID |
| TRUE | State 1 | TRUE | State 4 | Message 1 |
|  |  | FALSE | State 3 | Message 2 |
|  | State 2 | TRUE |  | Message 3 |
|  |  | FALSE | State 3 | Message 2 |
|  | State 3 |  |  |  |
|  | State 4 | TRUE | State 2 | Message 4 |
| FALSE | State 1 | TRUE |  | Message 1 |
|  | State 2 | FALSE | State 3 | Message 2 |
|  | State 3 | TRUE | State 2 |  |
|  |  | FALSE |  | Message 3 |
|  | State 4 |  | TRUE | State 4 | Message 4 |

*800*

*805*

Action C

| Command | Current States | | | Next State | |
|---|---|---|---|---|---|
| Addr | Condition 1 Boolean | CacheLine State | CacheLine State | Msg to HNID | Msg to RNID |
| Cmd1 | TRUE | State 1 | State 2 | Message 1 | Message A |
|  |  |  |  | Message 2 | Message B |
| Cmd2 | FALSE |  | Use Sub-action B |  | Message C |
|  |  | State 1 |  |  | Message A |
| Cmd3 | TRUE | State 2 |  |  | Message B |
|  |  |  |  |  | Message C |
|  |  | State 1 |  |  | Message D |

COHERENCE PROTOCOL TABLES

CROSS REFERENCE TO RELATED APPLICATIONS

This Application is a continuation (and claims the benefit of priority under 35 U.S.C. § 120) of U.S. application Ser. No. 13/976,950, with an effective filing date of Mar. 15, 2013 and entitled COHERENCE PROTOCOL TABLES, which application is a national stage application under 35 U.S.C. § 371 of PCT International Application Serial No. PCT/US2013/032709, filed on Mar. 15, 2013 and entitled COHERENCE PROTOCOL TABLES, which application claims the benefit of priority to U.S. Provisional Patent Application Ser. No. 61/717,091 filed on Oct. 22, 2012 and entitled METHOD, APPARATUS, SYSTEM FOR A HIGH PERFORMANCE INTERCONNECT ARCHITECTURE. The disclosures of the prior applications are considered part of and are hereby incorporated by reference in their entirety in the disclosure of this application.

FIELD

The present disclosure relates in general to the field of computer development, and more specifically, to software development involving coordination of mutually-dependent constrained systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 7 illustrates a representation of an example protocol state table.

FIG. 8 illustrates a representation of an example nesting of protocol state tables.

Like reference numbers and designations in the various drawings indicate like elements.

DETAILED DESCRIPTION

Figure 1:
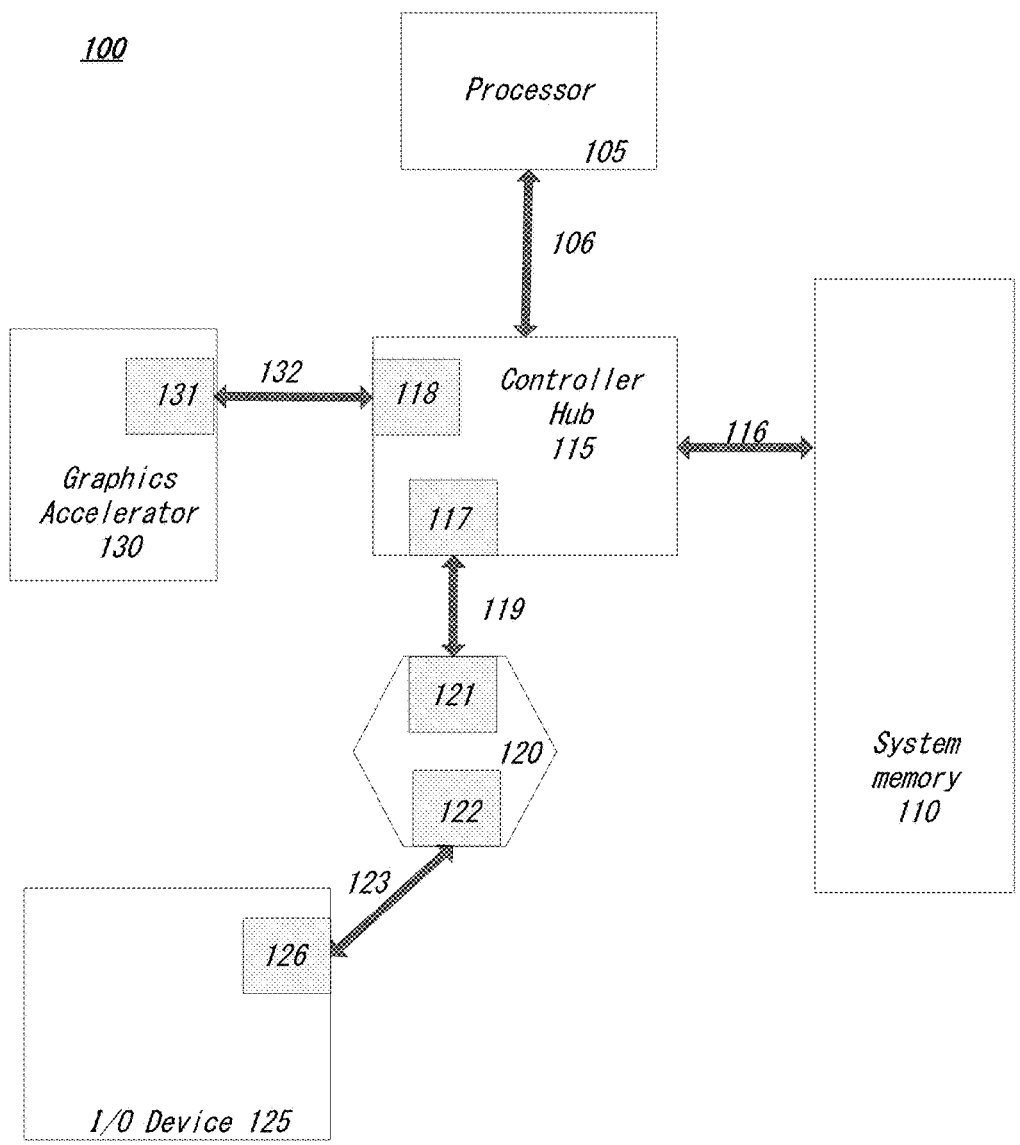
FIG. 1 illustrates a simplified block diagram of a system including a point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein. For instance, the Peripheral Component Interconnect (PCI) Express (PCIe) interconnect fabric architecture and QuickPath Interconnect (QPI) fabric architecture, among other examples, can potentially be improved according to one or more principles described herein, among other examples.

FIG. 1 illustrates one embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a south-bridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack and associated logic to communicate between graphics accelerator 130 and controller hub 115. Similar to the MCH discussion above, a graphics controller or the graphics accelerator 130 itself may be integrated in processor 105.

Figure 2:
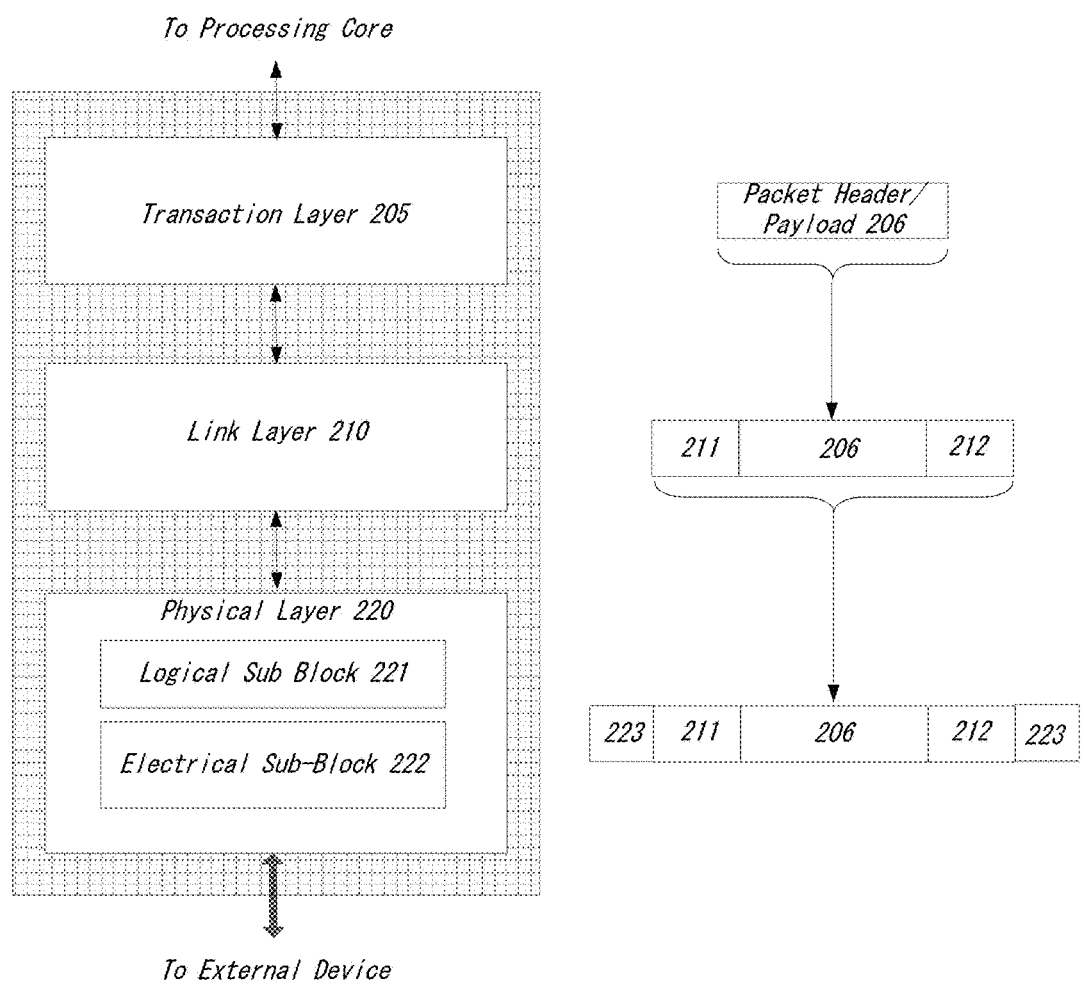
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
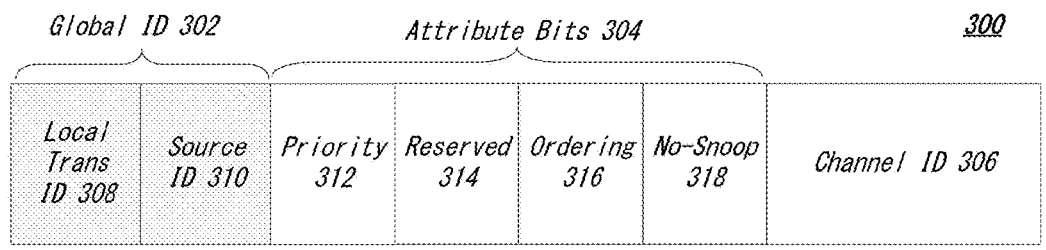
FIG. 3 illustrates an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8 b/10 b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
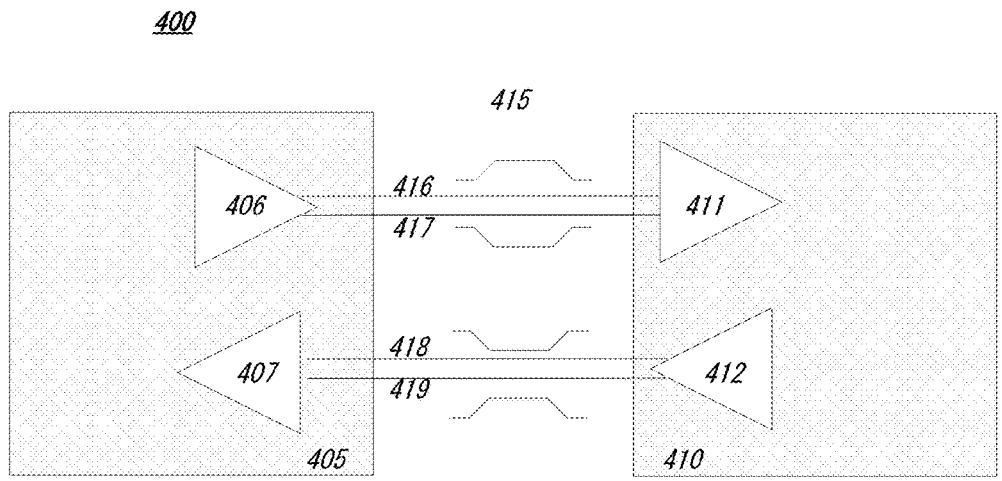
FIG. 4 illustrates an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
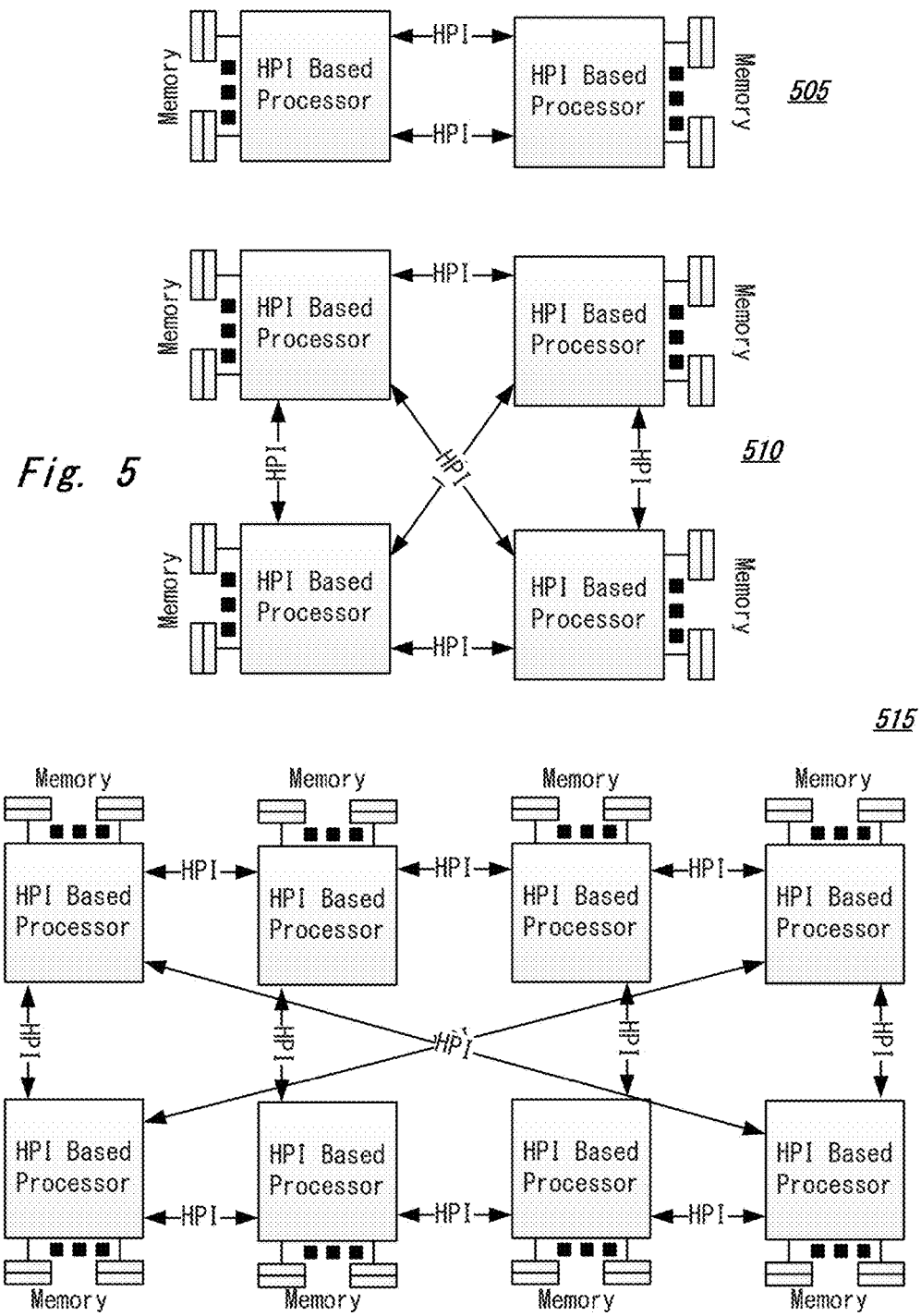
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

Figure 6:
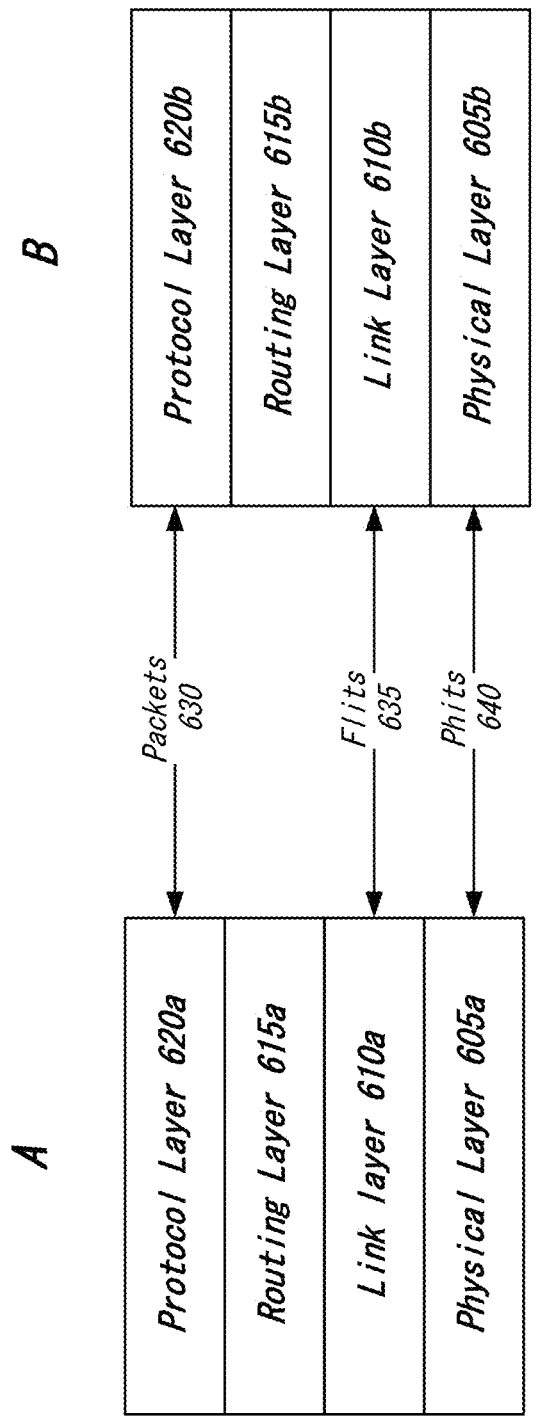
FIG. 6 illustrates an embodiment of a layered protocol stack associated with HPI.

The HPI architecture includes a definition of a layered protocol architecture, including in some examples, protocol layers (coherent, non-coherent, and, optionally, other memory based protocols), a routing layer, a link layer, and a physical layer including associated I/O logic. Furthermore, HPI can further include enhancements related to power managers (such as power control units (PCUs)), design for test and debug (DFT), fault handling, registers, security, among other examples. FIG. 6 illustrates an embodiment of an example HPI layered protocol stack. In some implementations, at least some of the layers illustrated in FIG. 6 may be optional. Each layer deals with its own level of granularity or quantum of information (the protocol layer 605a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer

605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, HPI can include a Coherence Protocol layer 620a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

The HPI Coherence Protocol also may ensure the forward progress of coherence requests made by an agent to an address in the coherent memory space. Certainly, transactions may eventually be satisfied and retired for proper system operation. The HPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the HPI Coherence Protocol, in one embodiment, can include three items: coherence (or "cache" or "caching") agents, home agents, and the HPI interconnect fabric connecting the agents. Coherence agents and home agents can work together to achieve data consistency by exchanging messages over the interconnect. The link layer 610a,b and its related description can provide the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit, among other examples.)

In one embodiment, home agents can be configured to guard physical memory. Each home agent can be responsible for a region of the coherent memory space. Regions may be non-overlapping, in that a single address is guarded by one home agent, and together the home agent regions in a system cover the coherent memory space. For instance, each address can be guarded by at least one home agent. Therefore, in one embodiment, each address in a HPI system's coherent memory space can map to exactly one home agent.

Home agents in the HPI Coherence Protocol, in one embodiment, can be responsible for servicing requests to the coherent memory space. For read (Rd) requests, home agents may generate snoops (Snp), process their responses, send a data response, and send a completion response. For invalidation (Inv) requests, home agents may generate necessary snoops, process their responses, and send a completion response. For write requests, home agents may commit the data to memory and send a completion response.

Home agents may provide snoops in the HPI Coherence Protocol and process snoop responses from coherence agents. Home agents can also process forward requests, which are a special snoop response, from coherence agents for conflict resolution. When a home agent receives a forward request, it may send a forward response to the coherence agent that generated the forward request (i.e., the agent that detected a conflicting snoop request). Coherence agents can use the ordering of these forward responses and completion responses from the home agent to resolve conflicts.

A coherence agent may issue supported coherence protocol requests. Requests may be issued to an address in the coherent memory space. Data received for read requests (Rd) except RdCur may be consistent. Data for RdCur requests may have been consistent when the data packet was generated (although it may have become out of date during delivery). Table 1 shows an exemplary, non-exhaustive list of potential supported requests:

HPI can support a Coherency protocol making use of principles of the MESI protocol. Each cache line can be marked with one or more supported states (e.g., coded in the cache line). A "M" or "Modified" state can indicate that the cache line value has been modified from that value which is in main memory. A line in the M-state is only present in the particular and the corresponding cache agent can be required to write the modified data back to memory at some time in the future, for instance, before permitting any other read of the (no longer valid) maing memory state. A writeback can transition the line from the M-state to the E-state. The "E" or "Exclusive" state can indicate that the cache line is only present in the current cache but that its value matches that in main memory. The cache line in E-state can transition to the S-state at any time in response to a read request or may be changed to the M-state by writing to the line. The "S" or "Shared" state can indicates that the cache line may be stored in other caches of the machine and has a value that matches that of the main memory. The line may be discarded (changed to the I-state) at any time. The "I" or "Invalid" state can indicate that a cache line is invalid or unused. Other state can also supported in HPI, such as an "F" or "Forward" shared state that indicates that the particular shared line value is to be forwarded to other caches that are to also share the line, among other examples.

Table 2 include exemplary information that can be included in some Coherence protocol messages, including snoop, read, and write requests, among other examples:

TABLE 1

| Name | Semantics | Cache State |
| --- | --- | --- |
| RdCode | Request a cache line in F or S state. | F or S |
| RdData | Request a cache line in E, F, or S state. | F or S |
| RdMigr | Request a cache line in M, E, F, or S state. | M and (F or S) |
| RdInv | Request a cache line in E state. If line was previously cached in M state, the line will be written to memory before E data is delivered. | E |
| RdInvOwn | Request a cache line in M or E state. | M |
| RdCur | Request an uncacheable snapshot of a cache line. | |
| InvItoE | Request exclusive ownership of a cache line without receiving data. | M or E |
| InvItoM | Request exclusive ownership of a cache line without receiving data and with the intent of performing a writeback soon afterward. | M or E |
| InvXtoI | Flush a cache line from all caches. Requesting agent is to invalidate the line in its cache before issuing this request. | |
| WbMtoI | Write a cache line in M state back to memory and invalidate the line in the cache. | M |
| WbMtoS | Write a cache line in M state back to memory and transition line to S state. | M and S |
| WbMtoE | Write a cache line in M state back to memory and transition line to E state. | M and E |
| WbMtoIPtl | Write a cache line in M state back to memory, according to a byte-enable mask, and transition line to I state. | M |
| WbMtoEPtl | Write a cache line in M state back to memory, according to a byte-enable mask, transition line to E state, and clear the line's mask in the cache. | M and E |
| EvctCln | Notification to home agent that a cache line in E state was invalidated in the cache. | E |
| WbPushMtoI | Send a line in M state to home agent and invalidate the line in the cache; home agent may either write the line back to memory or send it to a local cache agent with M state. | M |
| WbFlush | Request that home flush writes to implementation-specific addresses in its memory hierarchy. No data is sent with the request. | |

TABLE 2

| Field | Usage |
|---|---|
| cmd | Message command (or name or opcode). |
| addr | Address of a coherent cache line. |
| destNID | NID of destination (home or coherence) agent. |
| reqNID | NID of requesting coherence agent. |
| peerNID | NID of coherence agent that sent the (forward request) message. |
| reqTID | ID of the resource allocated by the requesting agent for the transaction, also known as RTID. |
| homeTID | ID of the resource allocated by the home agent to process the request, also known as HTID. |
| data | A cache line of data. |
| mask | Byte mask to qualify the data. |

Snoop messages may be generated by home agents and directed toward coherence agents. A snoop (SNP) virtual channel can be used for snoops and, in one embodiment, are the only messages that use the SNP virtual channel. Snoops can include the requesting agent's NID and the RTID it allocated for the request in case the snoop results in data being sent directly to the requesting agent. Snoops, in one embodiment, can also include the HTID allocated by the home agent to process the request. The coherence agent processing the snoop may include the HTID in the snoop response it sends back to the home agent. Snoops may, in some instance, not include the home agent's NID because it may be derived from the included address, which the targeted coherence agent does when sending its response. Fanout snoops (those with "SnpF" prefix) may not include a destination NID because the Routing Layer is responsible for generating the appropriate snoop messages to all peers in the fanout region. An exemplary list of snoop channel messages is listed Table 3:

TABLE 3

| Command | Semantics | Fields |
|---|---|---|
| SnpCode | Snoop to get data in F or S state. | cmd, |
| SnpData | Snoop to get data in E, F, or S state. | addr, |
| SnpMigr | Snoop to get data in M, E, F, or S state. | destNID, |
| SnpInv | Snoop to invalidate the peer's cache, flushing any M copy to memory. | reqNID, reqTID, |
| SnpInvOwn | Snoop to get data in M or E state. | homeTID |
| SnpCur | Snoop to get an uncacheable snapshot of a cache line. | |
| SnpFCode | Snoop to get data in F or S state; Routing layer to handle distribution to all fanout peers | cmd, addr, |
| SnpFData | Snoop to get data in E, F, or S state; Routing layer to handle distribution to all fanout peers | reqNID, reqTID, |
| SnpFMigr | Snoop to get data in M, E, F, or S state; Routing layer to handle distribution to all fanout peers | homeTID |
| SnpFInvOwn | Snoop to get data in M or E state; Routing layer to handle distribution to all fanout peers. | |
| SnpFInv | Snoop to invalidate the peer's cache, flushing any M copy to memory; Routing layer to handle distribution to all fanout peers. | |
| SnpCur | Snoop to get an uncacheable snapshot of a cache line; Routing layer to handle distribution to all fanout peers. | |

HPI may also support non snoop requests that they may issue to an address, such as those implemented as non-coherent requests. Examples of such requests can include a non-snoop read to request a read-only line form memory, a non-snoop write to write a line to memory, and a write a line to memory according to a mask, among other potential examples.

In one example, four general types of response messages can be defined in the HPI Coherence Protocol: data, completion, snoop, and forward. Certain data messages can carry an additional completion indication and certain snoop responses can carry data. Response messages may use the RSP virtual channel, and the communication fabric may maintain proper message delivery ordering among ordered completion responses and forward responses.

Table 4 includes a listing of at least some potential response messages supported by an example HPI Coherence Protocol:

TABLE 4

| Name | Semantics | Fields |
|---|---|---|
| Data_M | Data is M state. | cmd, |
| Data_E | Data is E state. | destNID, |
| Data_F | Data is F state. | reqTID, |
| Data_SI | Depending upon request, data in S state or uncacheable "snapshot" data. | data |
| Data_M | Data is M state with an ordered completion response. | |
| Data_E | Data is E state with an ordered completion response. | |

TABLE 4-continued

| Name | Semantics | Fields |
|---|---|---|
| Data_F | Data is F state with an ordered completion response. | |
| Data_SI | Depending upon request, data in S state or uncacheable "snapshot" data, with an ordered completion response. | |
| CmpU | Completion message with no ordering requirements. | cmd, |
| CmpO | Completion message to be ordered with forward responses. | destNID, reqTID |
| RspI | Cache is in I state. | cmd, |
| RspS | Cache is in S state. | destNID, |
| RspFwd | Copy of cache line was sent to requesting agent, cache state did not change. | homeTID |
| RspFwdI | Copy of cache line was sent to requesting agent, cache transitions to I state. | |
| RspFwdS | Copy of cache line was sent to requesting agent, cache transitions to S state. | |
| RspIWb | Modified line is being implicitly written back to memory, cache was transitioned to I state. | cmd, destNID, |
| RspSWb | Modified line is being implicitly written back to memory, cache was transitioned to S state. | homeTID, data |
| RspFwdIWb | Modified line is being implicitly written back to memory, copy of cache line was sent to requesting agent, cache was transitioned to I state. | |
| RspFwdSWb | Modified line is being implicitly written back to memory, copy of cache line was sent to requesting agent, cache was transitioned to S state. | |
| RspCnflt | Peer has an outstanding request to same address, is requesting an ordered forward response, and has allocated a resource for the forward. | cmd, destNID, homeTID, peerNID |

In one example, data responses can target a requesting coherence agent. A home agent may send any of the data responses. A coherence agent may send only data responses not containing an ordered completion indication. Additionally, coherence agents may be limited to sending data responses only as a result of processing a snoop request. Combined data and completion responses may always be of the ordered-completion type and can be kept ordered with forward responses by the communication fabric.

The HPI Coherence Protocol can uses the general unordered completion message and a coherence-specific ordered completion message. A home agent may send completion responses to coherent requests and completion responses can be typically destined for a coherence agent. The ordered completion response can be kept ordered with forward responses by the communication fabric.

Snoop responses may be sent by coherence agents, specifically in response to processing a snoop request, and target the home agent handling the snoop request. The destNID is usually a home agent (determined from the address in the snoop request) and the included TID is for the home agent's resource allocated to process the request. Snoop responses with "Wb" in the command are for implicit writebacks of modified cache lines, and they carry the cache line data. (Implicit writebacks can include those a coherence agent makes due to another agent's request, whereas the other requests are made explicitly by the coherence agent using its request resources.)

Coherence agents can generate a forward request when a snoop request conflicts with an outstanding request. Forward requests target the home agent that generated the snoop, which is determined from the address in the snoop request. Thus, the destNID is a home agent. The forward request can also include the TID for the home agent's resource allocated to process the original request and the NID of the coherence agent generating the forward request The HPI Coherence Protocol can support a single forward response, FwdCnfltO. Home agents can send a forward response for every forward request received and to the coherence agent in the forward request's peerNID field. Forward responses carry the cache line address so the coherence agent can match the message to the forward resource it allocated. Forward response message can carry the requesting agent's NID but, in some cases, not the requesting agent's TID. If a coherence agent wants to support cache-to-cache transfers for forward responses, it can save the requesting agent's TID when processing the snoop and send a forward request. To support conflict resolution, the communication fabric may maintain ordering between the forward response and all ordered completions sent before it to the same destination coherence agent.

In some implementations, state transitions of a cache line can be managed using a state machine. In one implementation, the state machine can be further embodied by a set or library of state tables that have been defined to detail all of the various combinations of commands, attributes, previous states, and other conditions that can influence how state transitions are to take place, as well as the types of messages, data operations, masks, and so on, that can be associated with the state transition. Each state table can correspond to a particular action or category of actions or states. The set of tables can include multiple tables, each table corresponding to a particular action or sub-action. The set of tables can embody a formal specification of a protocol, such as the Coherence Protocol or another protocol (at any of the stack layers) of HPI.

State tables can be human-readable files, such as table structures that can be readily interpreted and modified and developed by a human user interacting with the state table structure using an endpoint computer device. Other users can utilize the state table to readily interpret state transitions within the Coherence Protocol (or any other protocol of HPI). Further, state tables can be machine-readable and parsable structures that can be read and interpreted by a computer to identify how states are to transition according to a particular protocol specification.

FIG. 7 illustrates a simplified representation of a generalized state table for an action "Action A". A protocol state table 700, in one example, can include columns (e.g., 705) pertaining to current states (or the states from which a transition is to be made) and other columns (e.g., 710) pertaining to next states (or the states that are to be transitioned to). Columns in the current state columns can correspond to various characteristics of the state, such as commands received in a response message, snoop message, or other message, a cache line state, outgoing request buffer (ORB) condition, credits or resources to apply/reserve, whether the cache line is partially modified, a forwarding condition, and so on. Each row in the table 700 can correspond to a detected set of conditions for a cache line in a particular state. Further, the cells in the row within the next state columns (e.g., 710) can indicate the next state and conditions of the next state that is to be entered into based on the current state conditions specified in the row cells in the current state columns (e.g., 705). The next state columns (e.g., 710) can correspond to conditions in the next state such as the messages that are to be sent (e.g., to a corresponding home node (HNID), requesting node (RNID), peer node, etc.), the next cache line state, forward state, and so on.

In one embodiment, protocol state tables can use row spanning to indicate that multiple behaviors or states (rows) are equally permissible for a certain set of current state conditions. For instance, in the example of FIG. 7, when the Command is Cmd1, a first condition is false, the cache line is in a second state, and a second condition is also false (as indicated by rows 715), multiple potential next state conditions are possible and may be equally permissible, each indicated by a respective row. In other word, any one of such equally permissible transitions can be triggered based on the corresponding current state conditions. In some implementations, additional agent logic can select which of the multiple next state to select, among other example implementations. In one illustrative example, a current state section of a state table corresponding to home agent send request responses can include multiple conditions (or input and state guards) including all valid behaviors for a coherence agent to perform when the agent holds a full M-line in its cache and is processing a SnpMigr to the same cacheline. The table rows may correspond to five different, and equally permissible, next state behaviors the coherence agent can take in response to the current state conditions, among other examples.

In other systems, a bias bit may be included in protocol state tables where multiple potential next states or conditions are possible for a particular current state, In QPI, for instance, a "bias" bit is included in tables as a mechanism to select among behaviors. Such bias bits may be primarily used during validation of a protocol's state machine, but such bias bits introduce additional complexity and, in some cases, confusion unfamiliar with the utility of the bias bit. In some respects, a bias bit may be nothing more than an artifact of a validation exercise. In one example of HPI, through protocol tables using rows that potentially span multiple rows, bias bits and other features can be excluded. In such instances, HPI protocol tables can emphasize explicit non-determinism.

Turning to the example of FIG. 8, in one embodiment, protocol tables may be nested by having one table refer to another sub-table in the "next state" columns, and the nested table can have additional or finer-grained guards to specify which rows (behaviors) are permitted. As shown in FIG. 8, an example protocol state table 700 can include an embedded reference 805 to another table 800 included in the set of tables embodying a protocol specification, such as a state table pertaining to a sub-action related to the action or behavior included in the next state designated for certain rows of table 700. Multiple tables (e.g., 700, 810) can reference a nested table (e.g., 800). As an example, an agent processing incoming responses to protocol responses may follow an action table (e.g., 700, 810) and a subaction table 800. Here, action table 700 can include a next state with a subaction table nested under one or more other protocol tables. This type of nesting can apply beyond coherence protocol and protocol layer state tables, but can also be applied to any known or future protocol response/tables.

In one example, an agent can make use of protocol tables (or another parsable structure constructed from the protocol tables) and can identify a particular state table corresponding to a particular action or event. Further, the agent can identify the row that applies to the cache line handled or targeted by the agent and identify, from the table, the next state information for the cache line. This determination can include the identification of a reference to a nested table of a sub-action. Accordingly, the agent can identify the corresponding structure of the linked-to nested table and further reference the nested table to determine the state transition.

In one particular example, a collective set of protocol tables can be defined and represent all of the possible, defined state transitions in a protocol. Further, each table can specify a set of transitions covering a set of related behaviors within the protocol (e.g. one table covers all the behaviors involved in snooping and updating cache state, one covers all behaviors generating new requests, etc.). When an agent is to perform a behavior, process an event, or check if some other action should be taken the agent can identify the particular state table covering that particular behavior within the set of state tables. The agent can then identify the current state of the system and reference the selected state table to identify the row or group of rows matching the current state, if any. If no rows match, the agent may, in some instances, refrain from taking any action for the given current state and wait for some other event/behavior to change the state before trying again. Further, in some instances, as introduced above, if more than one row matches the identified system state, the agent can selects any of them to perform, as all can be regarded as equally permissible. Further, in the case of nesting, if a row refers to a nested table, the agent can access the nested table and use the identified current state of the system to search for allowed rows in the nested table.

In some examples, upon traversing any primary and nested tables to determine a response to a particular identified system (or protocol) state, the agent can cause the corresponding actions to be performed and the state of the system to be updated in accordance with the "next states" designated in the corresponding state tables.

In some instances, it can be possible that more than one state table relates to or covers a set of behaviors. For instance, as an illustrative example, two tables may be provided for processing snoops, the first for the case when there was a conflicting active request, the second table was for when there was not. Accordingly, in some implementations, an agent may survey multiple tables to determine which table includes rows relevant to the particular conditions and states identified by the agent. Further, in some cases, an agent may handle two unrelated or distinct events occurring simultaneously, such as an example where a home agent receives a snoop response and a new request at the same time. In instances where multiple events are being processes, an agent can identify and use multiple corresponding tables simultaneously to determine how to process the events.

Figure 9:
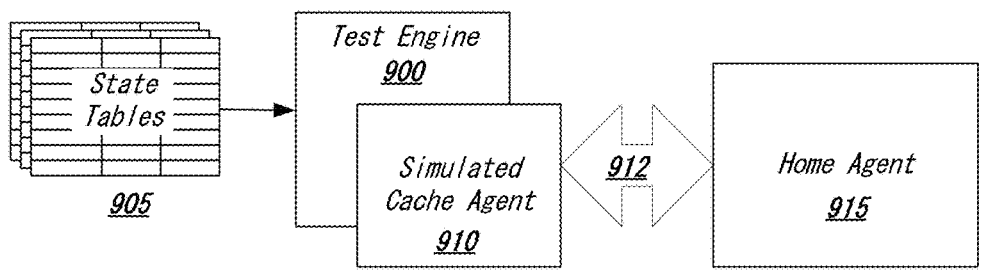
FIG. 9 illustrates a representation of use of a set of protocol state tables by an example testing engine.
Figure 10:
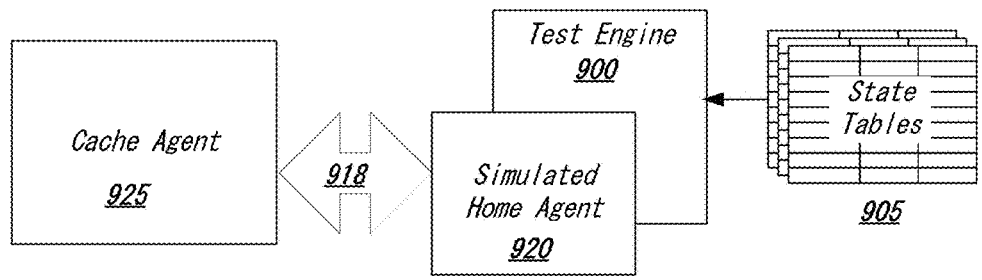
FIG. 10 illustrates a representation of use of a set of protocol state tables by an example testing engine.

Turning now to FIGS. 9 and 10, simplified block diagrams 900, 1000 are shown of examples of a testing or validation environment for use in validating at least a portion of a protocol. For instance, in the example of FIG. 9, a test engine 900 is provided adapted to validate a state machine of a protocol. For instance, in one example, test engine 900 can include or be based upon principles of a Murphi tool or another enumerative (explicit state) model checker, among other examples. For instance, other specification languages can be utilized in lieu of the Murphi examples described, including, as another example, TLA+ or another suitable language or format. In traditional systems, state model checkers have been constructed by human developers who attempt to translate state machines (e.g., from accompanying state tables, etc.) into a set of requirements that are then used to generate a checker capable of checking the state machine. This is not only a typically labor- and resource-intensive process, but also introduces human error as the states and state transitions of a state table are transcribed and interpreted by human users.

In one implementation, a test engine 900 can utilize a set of state tables (e.g., 905) to automatically generate, from the set of state tables, resources to model behaviors of agents in a test environment. For instance, in the example of FIG. 9, a test engine 900 can utilize the state tables 905 as a functionality engine for modeling a cache agent or other agent (e.g., 910) that can be used to validate various state transitions by simulating requests and responses (e.g., 912) with other real or simulated agents, including a home agent 915. Similarly, as shown in the example of FIG. 10, test engine 900 can utilize state tables 905 to simulate requests and responses (e.g., 918) of a home agent (e.g., 920) and interface with other real or simulated agents (e.g., 925) to further validate and enumerate states of the protocol. As an example, test engine 900 can model an agent and receive real or modeled protocol messages, such as HPI Coherence protocol messages, and reference state tables 905 (or another parsable structure generated from the state tables 905) to automatically generate an appropriate response, perform corresponding state transitions, and so on, based on the state tables 905.

In one particular implementation, a test engine or other software- or hardware-based utility can be used to utilize state tables (e.g., 905) to generate code to drive and react to designs that employ a particular protocol, such as HPI Coherence protocol. In this particular example, state tables can be utilized as an input of the test engine by converting tables or included pseudocode along with Murphi mappings for table values and pseudocode elements into appropriate Murphi rule and procedure format. The test engine can be used to further generate Murphi code for type definitions and supporting functionality. The Murphi rule, procedure, type and support code can be used to generate a Murphi model. The Murphi model can be translated, for instance, using a converter, to a C++ or other class definition. Indeed, any suitable programming language can be utilized. Sub-classes of the model class can be further generated and these modules can be used to behave as a simulated or testbench version of an agent employing and aligned to the protocol specification embodied in the state tables. Further, an internal API can be generated or otherwise provided that is aligned to message generation and message reception as defined in the protocol state tables. For instance, a message generation API can be tied to link packet types and message reception can be unified under single interface point. In this example, an entire formal protocol specification can be converted into a C++ (or other object-oriented programming language) class. Inheritance can be used to intercept messages generated, and instances of the inheriting class can be created as functional testbench agent(s). Generally, formal specification tables can be used as a functionality engine for a validation or testing environment tool rather than having developers separately create their own tools based upon their interpretation of the specification.

HPI can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Figure 11:
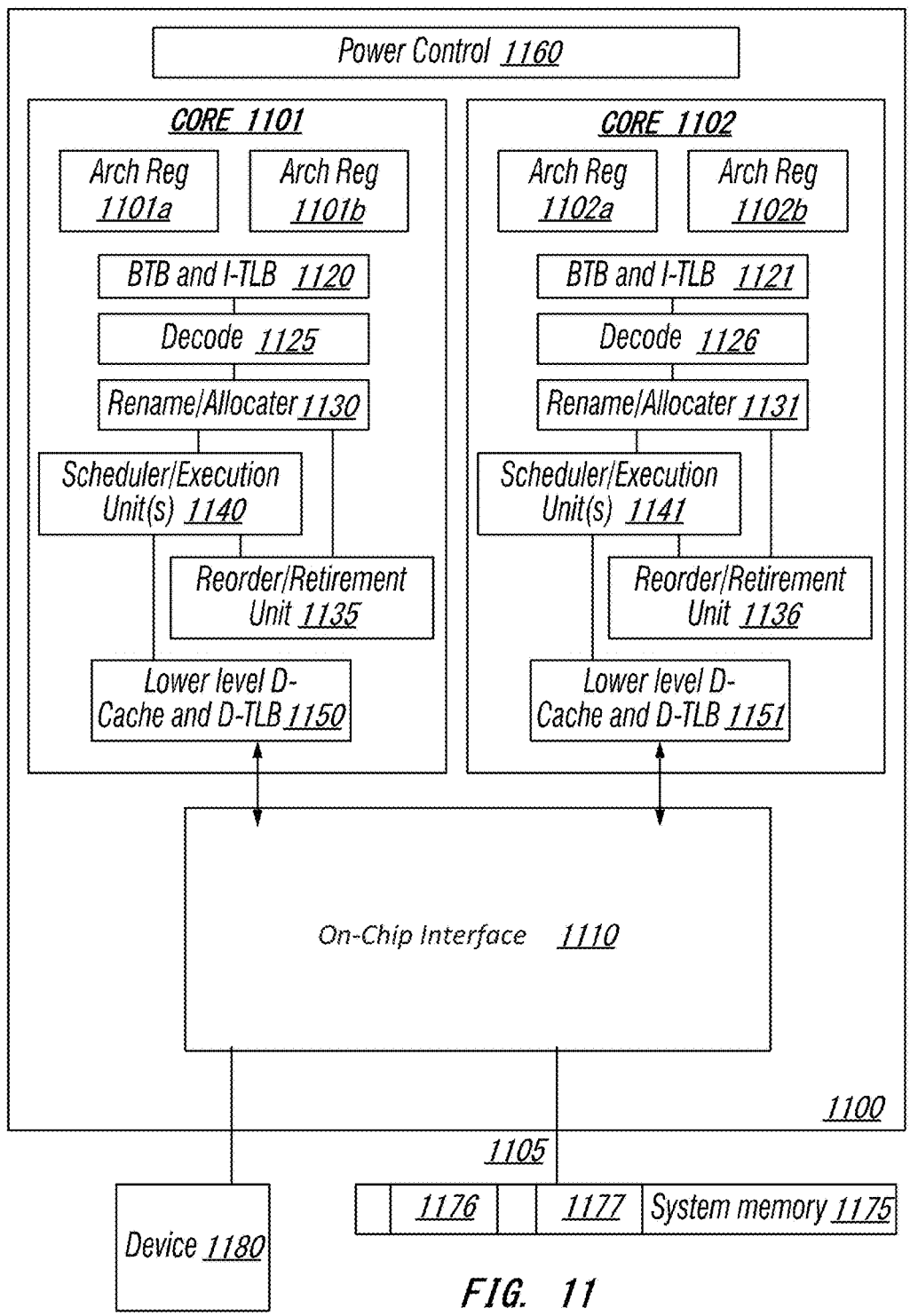
FIG. 11 illustrates an embodiment of a block diagram for a computing system including a multicore processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1151, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 111 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
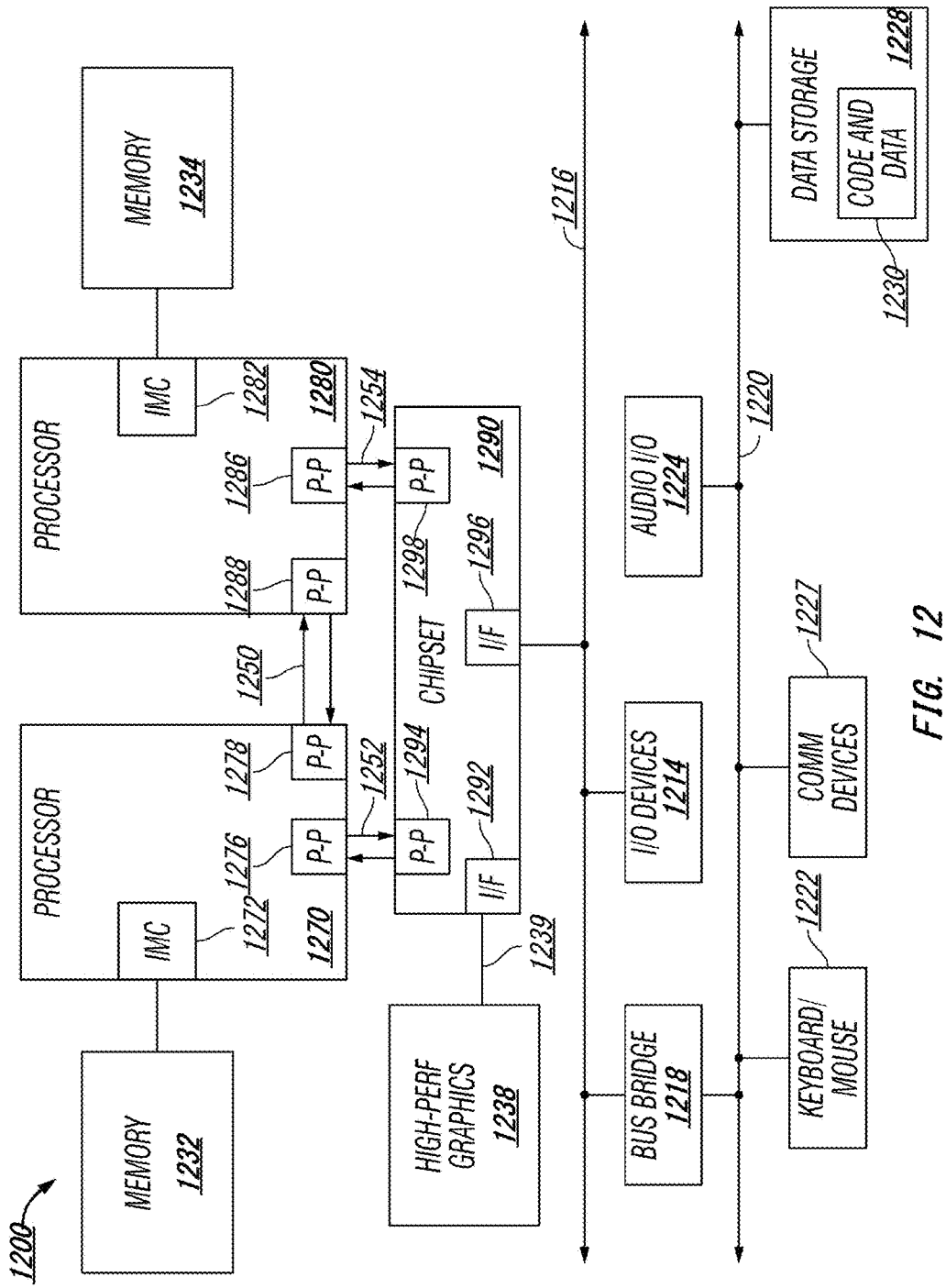
FIG. 12 illustrates an embodiment of a block for an example computing system.

HPI can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, FIG. 12 illustrates an example computer system 1200 in accordance with some implementations. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as a high-performance architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to provide an agent including state table storage to hold a set of state tables to represent a plurality of coherence protocol actions, where the set of state tables is to include at least one nested state table, and protocol logic associated with the state table storage, the protocol logic to receive a coherence protocol message, and determine a coherence protocol action of the plurality of coherence protocol actions from the set of state tables based at least in part on the coherence protocol message.

In at least one example, the nested state table includes a particular state table also linked to in at least one other state table in the set of state tables.

In at least one example, where the particular state table corresponds to a sub-action of an action corresponding to the other state table.

In at least one example, where the particular state table is linked to by a plurality of different state tables in the set of state tables.

In at least one example, the protocol layer logic is to identify a particular state table in the set of state tables corresponding to the message, identify a row of the particular table corresponding to attributes of the message, and identifying a reference to the nested state table in the row, where the coherence protocol action is to be determined based at least in part on the nested state table.

In at least one example, the particular state table includes one or more columns corresponding to current states and one or more columns corresponding to next states, and the reference to the nested state table is included in the columns corresponding to next states.

In at least one example, the coherence protocol action includes transitioning to another state specified by one or more cells in the columns corresponding to next states.

In at least one example, the message includes at least one of a snoop, a data message, a completion, and a forward response message.

In at least one example, the set of tables embodies a formal specification of a protocol.

In at least one example, the protocol includes a coherence protocol.

In at least one example, the set of tables are machine-parsable tables.

In at least one example, the set of tables includes explicitly non-deterministic tables.

In at least one example, the set of tables lack bias fields.

One or more embodiments may provide an apparatus, a system, a machine readable storage, a machine readable medium, and a method to provide state table storage to hold a set of state tables to represent a plurality of coherence protocol actions, where the set of state tables is to include at least one nested state table, and a test engine adapted to validate at least a portion of a state machine of a particular protocol, where validation of the state machine includes simulating coherence protocol actions of an agent and the set of state tables is to be used to simulate the coherence protocol action of the agent in accordance with the particular protocol.

In at least one example, the particular protocol includes a coherence protocol. In at least one example, a testbench agent is to be generated from the set of state tables. In at least one example, generating a testbench agent includes generating at least one Murphi model from the set of state tables. In at least one example, generating the testbench agent further includes translating the Murphi model into at least one class definition. In at least one example, the testbench agent, when executed, is to simulate requests and responses of the agent.

In at least one example, the set of state tables include at least one nested state table. In at least one example, the nested state table includes a particular state table linked to in at least one other state table in the set of state tables. In at least one example, the nested state table corresponds to a subaction of an action corresponding to the other state table.

One or more embodiments may provide an apparatus, a system, a machine readable storage, a machine readable medium, and a method to receive a coherence protocol message, identify a particular state table in the set of state tables corresponding to the message, where the set of state tables includes one or more nested state tables, identifying a reference to another, nested state table in particular state table, and determining a response to the message based at least in part on contents of the other state table.

In at least one example, the response includes one or more of a state transition and a response message. In at least one example, response message includes at least one of a snoop response message, writeback message, read message, data message, and forward request message.

In at least one example, the response is to model a response of an agent in a test. In at least one example, the test includes a validation of at least a portion of a protocol. In at least one example, the set of state tables are explicitly non-deterministic.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising: a coherence agent, implemented at least in part in hardware, wherein the coherence agent is to: identify a particular action; identify that a particular one of a plurality of state machine tables stored in memory corresponds to the particular action, wherein the plurality of state machine tables comprise machine-readable table structures and describe conditions governing state machine transitions to be made by coherence agents to comply with a particular coherence protocol; read the particular table to identify a particular row corresponding to a current coherence state of a cache line, wherein the particular row comprises a reference to another one of the plurality of state machine tables; access the other state machine table based on the reference to determine a particular coherence state transition from the current coherence state of the cache line; and transition the cache line from the current coherence state to a new coherence state based on the particular coherence state transition; and handle a request from another coherence agent corresponding to a cache managed by the coherence agent based on the new coherence state.

2. The apparatus of claim 1, wherein the reference comprises a link to the particular state machine table.

3. The apparatus of claim 2, wherein the other state machine table is linked to by a plurality of different state machine tables in the plurality of state machine tables.

4. The apparatus of claim 1, wherein the other state machine table is referenced in at least one other state machine table.

5. The apparatus of claim 1, wherein the particular state table includes one or more columns corresponding to current states and one or more columns associated with next states, and the reference to the other state machine table is included in the columns associated with next states.

6. The apparatus of claim 5, wherein the new state is determined from a particular one of the cells in the one or more columns associated with next states.

7. The apparatus of claim 1, wherein the plurality of state machine tables embodies a formal specification of a protocol.

8. The apparatus of claim 7, wherein the plurality of state machine tables comprise machine-parsable tables.

9. The apparatus of claim 1, wherein the plurality of state machine tables comprises explicitly non-deterministic tables.

10. The apparatus of claim 9, wherein the plurality of state machine tables lack bias fields.

11. An apparatus comprising:
a computer-readable memory storing a plurality of state machine tables of a formal specification for a coherence protocol, wherein the plurality of state machine tables comprise machine-readable table structures and describe conditions governing state machine transitions to be made by coherence agents in compliance with the coherence protocol, each of the state machine tables is associated with a respective action and includes a plurality of respective columns, some of the columns are associated with a current state and other columns are associated with a next state, at least one column associated with a next state of a particular one of the plurality of state machine tables includes a reference to another one of the plurality of state machine tables, the particular state machine table is associated with a particular action, and the other state machine table is associated with a sub-action; and
a coherence agent, implemented at least in part in hardware, to use the plurality of state machines to determine behaviors of the coherence agent required or allowed by the coherence protocol, wherein the behaviors comprise transitioning a cache line from a current coherence state to a next coherence state,
wherein the coherence agents are further to handle a request corresponding to a cache managed by the coherence agent based on the new coherence state.

12. A method comprising: receiving, at a coherence agent of a device, coherence protocol information; identifying a particular state table in a plurality of state machine tables stored in memory corresponding to the information, wherein the plurality of state machine tables comprise machine-readable table structures and describe conditions governing state machine transitions to be made by coherence agents to comply with a particular coherence protocol, and reading the particular table to identify a particular row of the particular table corresponding to a current coherence state of a cache line, wherein the particular row comprises a reference to another one of the plurality of state machine tables; accessing the other state machine table based on the reference; and performing a state machine transition from the current coherence state for the cache line based at least in part on contents of the other state machine table; and handling a request, received from another coherence agent, corresponding to a cache managed by the coherence agent based on the new coherence state.

13. The method of claim 12, wherein the other state machine table corresponds to a sub-action of an action corresponding to the particular state table.

14. The method of claim 13, wherein two or more of the plurality of state machine tables reference the other table.

15. The method of claim 12, wherein the coherence protocol information comprises at least one of a snoop, a data message, a completion, and a forward response message.

16. A system comprising:
a home agent comprising hardware circuitry, the home agent to service requests to a coherent memory space;
a cache agent comprising hardware circuitry, the cache agent communicatively coupled to the home agent, the cache agent to make requests of the coherent memory space according to a coherence protocol; and
a computer-readable memory accessible by the cache agent, the memory to store a plurality of state machine tables corresponding to the information, wherein the plurality of state machine tables comprise machine-readable table structures and describe conditions governing state machine transitions to be made by coherence agents to comply with a particular coherence protocol, a particular state machine table corresponds to a particular action and directs the cache agent to use another one of the plurality of state machine tables corresponding to a sub-action in association with entering a next state, and the particular table includes a reference to the other state machine table in a particular row of the particular table corresponding to a transition to the next state, wherein the coherence agents are further to handle a request corresponding to a cache managed by the coherence agent based on the new coherence state.

17. The system of claim 16, wherein the cache agent is further to receive responses to the requests of the coherent memory space from the home agent.

18. The system of claim 17, wherein the cache agent is to determine a response from the plurality of state tables.

19. The system of claim 18, wherein the response is based at least in part on content of the other state machine table.

20. The system of claim 16, wherein the set of state tables are explicitly non-deterministic.

\* \* \* \* \*